B. F. SPARROW.
Dough-Mixer.
No. 206,275.   Patented July 23, 1878.
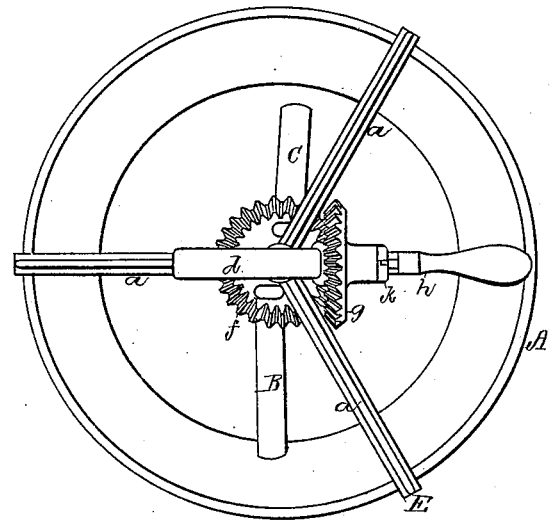
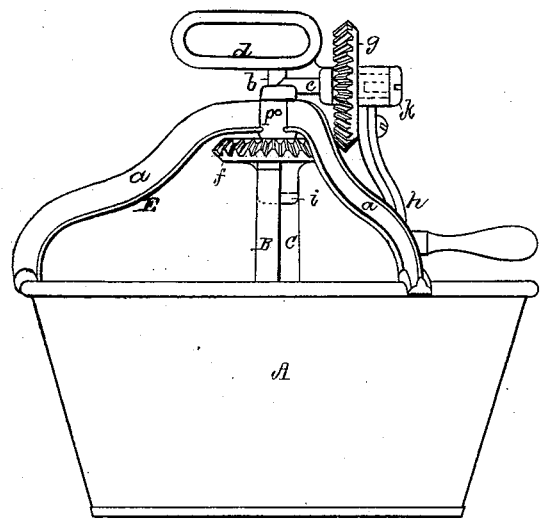
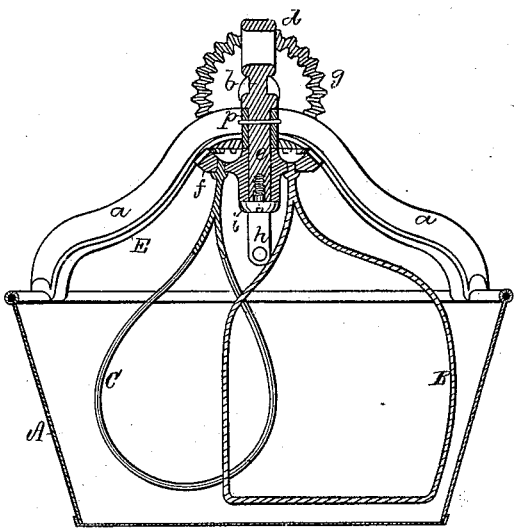
Witnesses:
Inventor
Benjamin F. Sparrow

UNITED STATES PATENT OFFICE.

BENJAMIN F. SPARROW, OF CAMBRIDGEPORT, MASSACHUSETTS, ASSIGNOR TO HERBERT F. SPARROW, OF SAME PLACE.

IMPROVEMENT IN DOUGH-MIXERS.

Specification forming part of Letters Patent No. 206,275, dated July 23, 1878; application filed March 8, 1878.

To all whom it may concern:

Be it known that I, BENJAMIN F. SPARROW, of Cambridgeport, of the county of Middlesex and State of Massachusetts, have invented a new and useful Improvement in Dough-Mixers; and do hereby declare the same to be described in the following specification and represented in the accompanying drawings, of which—

Figure 1 is a top view, Fig. 2 a side elevation, and Fig. 3 a transverse section, of a mixer embracing my invention, of which—

The first portion relates to the stand for supporting the stirrup-shaped stirrers and their operative mechanism, it being composed of a series of legs, two journals, and an open handle, arranged and formed substantially as described and represented.

The second part of the invention relates to the mechanism for effecting the mixing of the dough; and consists in two stirrup-shaped stirrers or cutters, arranged to lap on one another, so as while being revolved to cut and travel in separate paths in the dough.

In the drawings, A represents the pan to contain the materials of which the dough is to be composed. Resting on the upper edge of it is a stand, E, consisting of three legs, $a\ a\ a$, radiating from a common eye or center-piece, $p$, and formed as shown, each leg at its foot being notched to receive the edge of the pan. From the junction of the legs, or from a short post, $b$, extending up therefrom, there projects horizontally a journal, $c$, and an open handle, $d$, and there also extends downward from the said junction $p$ another journal, $e$. This latter journal is the pivot on which a bevel-gear, $f$, is placed, and is to revolve. The said gear engages with another such gear, $g$, pivoted on the journal $c$, and provided with a crank, $h$. Headed screws $i\ k$, inserted endwise in the journals, serve to keep the gears in engagement with them.

From the horizontal gear there projects downward into the pan two stirrup-shaped cutters or stirrers, B C, each of which laps upon the other; besides, one is wider than the other, and extends a short distance lower in the pan than does the smaller one. Each edge of each stirrer is sharp, to enable the stirrer to readily cut its way through the dough.

On turning the crank the two stirrers will be simultaneously revolved within the pan, and will cut in different paths, so as to break up the dough and mix together to excellent advantages the materials for composing it.

The handle, arranged as set forth, enables a woman, while the pan is resting in her lap or on the table, to hold it firmly in place with one hand, while with the other she may be revolving the crank.

I am aware that stirrup-shaped stirrers are not new in dough-mixers; but they have been arranged apart from one another, so as when revolved about their common axis to travel in the same path. Besides the mechanism for so revolving them, they have also had mechanism for otherwise revolving them—viz., in a circular orbit.

I do not claim such, as it will be seen that with my improvement each of the stirrup-shaped stirrers of a pair laps on the other, and one projects a greater distance from its axis of revolution than the other does, whereby while revolving they are caused to cut and travel in different paths, and thereby to stir the dough or the ingredients composing it with excellent effects.

What, therefore, I claim as my invention in the dough-mixer is as follows:

In a device for mixing dough, the two stirrup-shaped cutters or stirrers fixed to and extended from a single gear-wheel, $f$, as described, in combination with the single gear-wheel $g$ and frame E, constructed and arranged to operate as set forth.

BENJAMIN F. SPARROW.

Witnesses:
R. H. EDDY,
JOHN R. SNOW.